(12) United States Patent
Inukai

(10) Patent No.: US 6,882,454 B2
(45) Date of Patent: Apr. 19, 2005

(54) MULTI-BEAM SCANNER

(75) Inventor: Katsumi Inukai, Iwakura (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/916,614

(22) Filed: Aug. 12, 2004

(65) Prior Publication Data

US 2005/0036188 A1 Feb. 17, 2005

(30) Foreign Application Priority Data

Aug. 15, 2003 (JP) ........................................ 2003-293832

(51) Int. Cl.[7] .............................................. G02B 26/08
(52) U.S. Cl. ........................ 359/204; 347/235; 347/237; 250/235
(58) Field of Search .................. 359/204, 212–219; 250/234–236, 227.26; 347/233, 235, 237

(56) References Cited

U.S. PATENT DOCUMENTS 6,163,333 A * 12/2000 Kamioka ..................... 347/241

6,466,247 B1 * 10/2002 Sugano et al. ............... 347/250

FOREIGN PATENT DOCUMENTS

JP  A 2003-25626  1/2003

* cited by examiner

Primary Examiner—James Phan
(74) Attorney, Agent, or Firm—Oliff & Berridge, PLC

(57) ABSTRACT

While scanning two laser beams that are separated by a prescribed distance d in the scanning direction, one of the beams is first irradiated onto a BD sensor at a timing t11. However, the sensor signal Vs emitted from the BD sensor changes only slightly at this time, and the amplified sensor signal Vg, which is a reverse amplification of the sensor signal Vs, does not reach the threshold level Vth. Subsequently, at a timing t12 the other laser beam is irradiated onto the BD sensor so that both laser beams are simultaneously irradiated on the BD sensor. At this time, the amplified sensor signal Vg rises enough to exceed the threshold level Vth, and the BD signal is outputted (switched to low level). By outputting a BD signal upon simultaneously receiving two laser beams in this way, stability of the BD signal is improved.

9 Claims, 8 Drawing Sheets

MULTI-BEAM SCANNER

BACKGROUND OF THE INVENTION

1. Field of the Invention

The present invention relates to a multi-beam scanner for scanning laser beams emitted from a plurality of laser light sources at fixed time intervals in a prescribed direction. The present invention also relates to an image-forming device equipped with this multi-beam scanner.

2. Description of Related Art

Image-forming devices such as laser p-inters, photocopiers, and facsimile machines have been provided with laser scanners for irradiating a laser beam onto a photosensitive drum in order to form images thereon. Such a laser scanner is provided with a laser diode, a polygon mirror for scanning the laser beam in a main scanning direction, and the like.

The laser beam produced by the laser diode is modulated according to image data and irradiated onto the surface of the photosensitive drum beginning from a prescribed image-writing start position. A beam detect (BD) sensor is provided for detecting this image-writing start position. The BD sensor is disposed within the scanning range of the laser beam so as to receive the laser beam at a prescribed position preceding the image-writing start position. The BD sensor outputs a sensor signal corresponding to the amount of received light. As will be described later, a synchronization signal (BD signal) for setting the image-writing start position is outputted based on the sensor signals received from the BD sensor. More specifically, a BD signal is outputted when the amount of light received by the BD sensor reaches or exceeds the required amount of light for forming electrostatic latent images when irradiated on the photosensitive drum.

SUMMARY OF THE INVENTION

Figure 1:
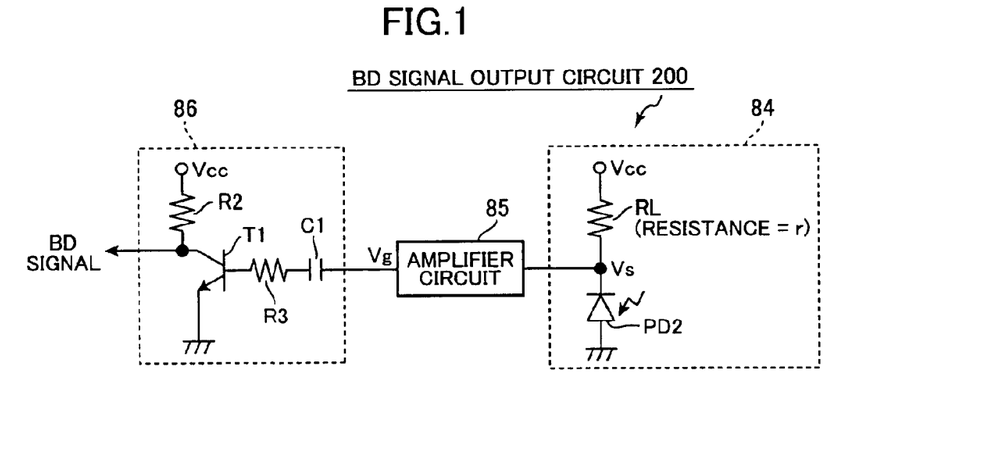
FIG. 1 is an explanatory diagram showing the general configuration of a conceivable BD signal output circuit.

FIG. 1 shows the configuration of a conceivable BD signal output circuit 200, which is provided with a BD sensor and other circuits and which is for outputting a BD signal based on the sensor signal from the ED sensor.

As shown in FIG. 1, the conceivable BD signal output circuit 200 includes a BD sensor 84, an amplifier circuit 85, and an AD conversion circuit 86. The BD sensor 84 is provided with a photodiode PD2, an element for receiving a laser beam emitted from the laser diode (not shown). Specifically, an anode of the photodiode PD2 is grounded, while a cathode is connected to a supply voltage Vcc via a pull-up load resistor RL. Hence, the supply voltage Vcc applies a voltage to the series circuit formed of the pull-up load resistor RL and the photodiode PD2 so as to apply a reverse bias to the photodiode PD2. The photodiode PD2 is a PIN-type photodiode. The potential at the connecting point between the pull-up load resistor RL and the photodiode PD2 is outputted as a sensor signal Vs corresponding to the total amount of the laser light received by the photodiode PD2.

Since the sensor signal Vs decreases as the amount of received light increases, the sensor signal Vs undergoes reverse amplification in the amplifier circuit $V_s$ at a prescribed gain, and the amplifier circuit 85 outputs an amplified sensor signal Vg to the AD conversion circuit 86, which signal increases in response to an increase in received light. The amplified sensor signal Vg undergoes AD conversion in the AD conversion circuit 86 and is outputted as a BD signal.

A transistor T1 in the AD conversion circuit 86 is turned on or off according to the amplified sensor signal Vg, and the AD conversion circuit 86 outputs a BD signal (low level) when the transistor. T1 is on. Specifically, the amplified sensor signal Vg is inputted into a base of the transistor T1 via a base resistor R3 after a capacitor C1 blocks the DC component. The emitter of the transistor T1 is grounded, while the collector is connected to a supply voltage Vcc via a pull-up resistor R2. Accordingly, the potential of the collector is outputted as the BD signal.

Figure 2:
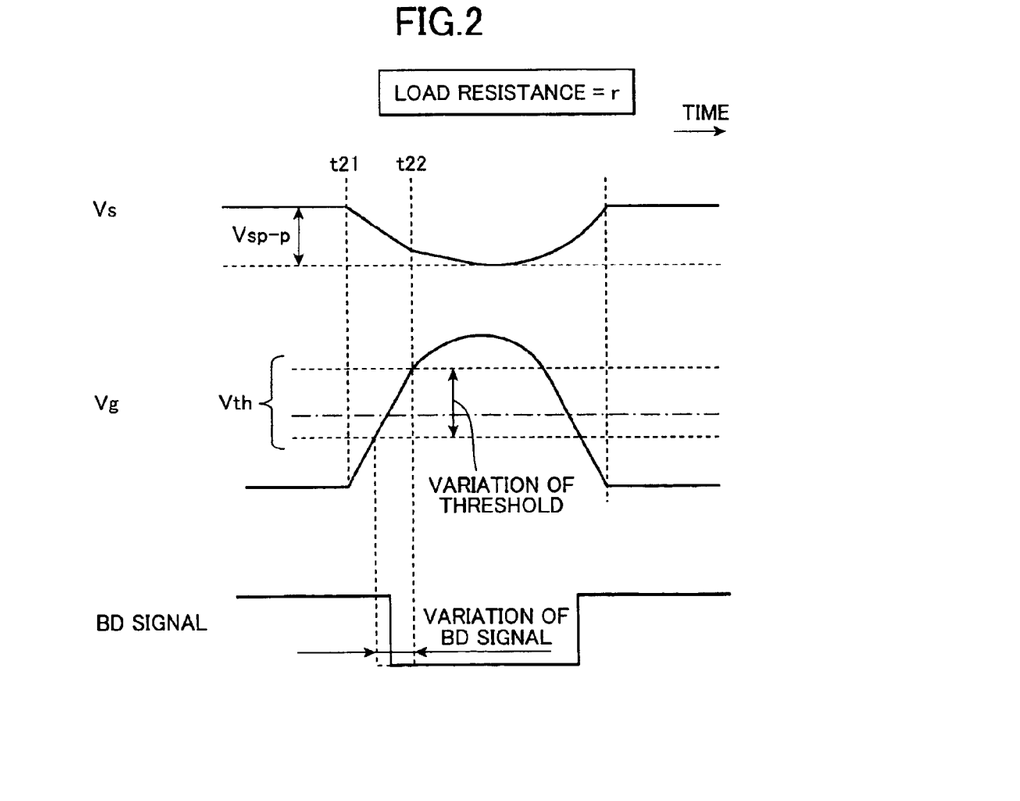
FIG. 2 is a timing chart illustrating how the BD signal changes in response to the sensor signal Vs according to the conceivable BD signal output circuit of FIG. 1.

FIG. 2 shows how the BD signal changes in response to the sensor signal Vs. When the photodiode PD2 receives the laser beam, the sensor signal Vs drops an amount of a peak-to-peak (PP) voltage Vsp-p that corresponds to the amount of received light, as shown in the drawing (t21–t22). Specifically, the PP voltage Vsp-p is the difference between the sensor signal Vs when no light is received and the sensor signal Vs when light is received. The amplified sensor signal Vg increases as the sensor signal Vs drops. When the amplified sensor signal Vg becomes greater than or equal to a prescribed threshold level Vtb, the transistor T1 turns on and the BD signal is outputted. The threshold, level Vth is the minimum level required to turn on the transistor T1.

The threshold level Vth generally has a certain amount of variation, as shown in FIG. 2, which can lead to, fluctuations in the output timing of the BD signal (the timing in which the BD signal drops to low level), thereby decreasing the precision and stability of the BD signal. This range of variation in the generating timing of the BD signal may be anywhere from a few nanoseconds (nsec) to tens of nsec, for example. However, with the increasing printing speeds and densities in recent image-forming devices, this range of variation is sufficient to cause deterioration in printing precision.

In order to suppress variations in the output timing for BD signals, it is conceivable to increase the speed at which the sensor signal Vs changes when the laser beam is received, that is, to shorten the time interval t21–t22 in which the PP voltage Vsp-p declines after light is received. Specifically, by reducing the resistance value of the load resistor RL (hereinafter referred to as "load resistance," which is r in the example of FIG. 1), the sensor signal Vs can be made to change quickly in response to changes in the amount of received light.

However, while reducing the load resistance improves the response to changes in the amount of received light, the PP voltage Vsp-p becomes smaller, thereby weakening the noise reduction characteristics of the sensor and increasing the possibility of malfunctions due to noise. While it is technically possible to increase the response to changes in received light in the photodiode PD2 itself, it is not realistic, as such a photodiode would be extremely expensive.

Recently, however, there has been an increase in the use of multi-beam scanners equipped with laser diodes that have a plurality of semiconductor laser light-emitting elements (hereinafter simply referred to as "semiconductor lasers"). The rate of image formation can be increased by using such laser diodes because multiple lines of an image can be formed in a single scan.

In order to obtain a stable BD signal in the multi-beam scanner described above, a multi-beam writing device has been proposed in Japanese unexamined patent application publication No. 2003-25626. This device is configured to receive laser beams from a plurality of semiconductor lasers simultaneously, rather than from a single laser beam, and increases the power of the received light so that the PP voltage Vsp-p achieves a sufficiently large level.

However, while the technology disclosed in Japanese unexamined patent application publication No. 2003-25626 described above can reliably acquire a BD signal by ensuring sufficient power of the received light, this technology simply increases the amount of received light. This technology does not address the problem of response attributed to the load resistance.

Therefore, while the PP voltage Vsp-p will increase as a result of the increased amount of received light when the aforementioned technology is applied to the BD signal output circuit of FIG. 1, there will be little reduction of variations in the output timing of the BD signal.

In view of the foregoing, it is an object of the present invention to provide a multi-beam scanner capable of suppressing variations in the output timing of a BD signal (synchronization signal) and capable of achieving a highly stable synchronization signal at a low cost. It is another object of the present invention to provide an image-forming device equipped with this multi-beam scanner.

In order to attain the above and other objects, the present invention provides a multi-beam scanner including: a semiconductor laser device; a scanning device; a light-detecting device; and a synchronization signal outputting device. The semiconductor laser device has a plurality of laser light sources emitting a plurality of laser beams. The scanning device scans the laser beams in a predetermined scanning direction at fixed time intervals within a predetermined scanning range. The light-detecting device receives, at a location within the predetermined scanning range, the laser beams scanned by the scanning device, and outputs a light-reception signal, whose value corresponds to the total amount of light received. The number of laser beams, among the plurality of laser beams, that fall incident on the light-detecting device simultaneously changes as the scanning device scans the laser beams. The light-detecting device outputs the light-reception signal, whose value is greater than or equal to a predetermined synchronization detection level, when the light-detecting device receives the at least two of the laser beams simultaneously. The synchronization signal outputting device outputs a synchronization signal indicating a start timing at which the scanning device starts scanning the laser beams when the light-reception signal from the light-detecting device becomes greater than or equal to the predetermined synchronization detection level.

According to another aspect, the present invention provides a multi-beam scanner including: a semiconductor laser device; a scanning device; a light-detecting device; and a synchronization signal outputting-device. The semiconductor laser device has a plurality of laser light sources emitting a plurality of laser beams. The scanning, device scans the laser beams in a predetermined scanning direction at fixed time intervals within a predetermined scanning range. The light-detecting device receives, at a location within the predetermined scanning range, the laser beams scanned by the scanning device, and outputs a light-reception signal, whose value corresponds to the total amount of light received. The number of laser beams, among the plurality of laser beams, that fall incident on the light-detecting device simultaneously changes as the scanning device scans the laser beams. The light-detecting device outputs the light-reception signal, whose value is greater than or equal to a predetermined synchronization detection level, when the light-detecting device receives the at least two of the laser beams simultaneously. The light-detecting device includes: a photoelectric converting unit; and an inverse outputting unit. The photoelectric converting unit includes a series circuit having a resistor and a photoelectric converting element, which are connected with each other in series, a constant voltage bias being applied to the series circuit, a potential at a contact point between the resistor and the photoelectric converting element decreasing in response to an increase in the amount of light received by the photoelectric converting element. The inverse outputting unit inverts the change in potential at the contact point to cause the potential to increase in response to an increase in the amount of the light received by the photoelectric converting element, the inverse outputting unit outputting the inverted potential as the light-reception signal. The resistor has a resistance value that allows, when the light-detecting device receives the at least two of the laser beams simultaneously, the inverse outputting unit to output the light-reception signal whose value is greater than or equal to a predetermined synchronization detection level, and that is smaller than a value that allows, when the light-detecting device receives one of the laser beams, the inverse outputting unit to output the light-reception signal whose value is equal to the predetermined synchronization detection level. The synchronization signal outputting device outputs a synchronization signal indicating a start timing at which the scanning device starts scanning the laser beams when the light-reception signal from the light-detecting device becomes greater than or equal to the predetermined synchronization detection level.

According to another aspect, the present invention provides an image-forming device including: a multi-beam scanner: a plurality of modulating devices; a photosensitive member; a developing device; and a transferring device. The multi-beam scanner includes: a semiconductor laser device; a scanning device; a light-detecting device; and a synchronization signal outputting device. The semiconductor laser device has a plurality of laser light sources emitting a plurality of laser beams, each laser light source including a semiconductor light-emitting element. The scanning device scans the laser beams in a predetermined scanning direction at fixed time intervals within a predetermined scanning range. The light-detecting device receives, at a location within the predetermined scanning range, the laser beams scanned by the scanning device, and outputs a light-reception signal, whose value corresponds to the total amount of light received, the number of laser beams, among the plurality of laser beams, that fall incident on the light-detecting device simultaneously changing as the scanning device scans the laser beams, the light-detecting device outputting the light-reception signal, whose value is greater than or equal to a predetermined synchronization detection level, when the light-detecting device receives the at least two of the laser beams simultaneously. The synchronization signal outputting device outputs a synchronization signal indicating a start timing at which the scanning device starts scanning the laser beams when the light-reception signal from the light-detecting device becomes greater than or equal to a predetermined synchronization detection level. Each of the plurality of modulating devices modulates, according to image data, a supply current supplied to a semiconductor light-emitting element in a corresponding laser light source. The photosensitive member has a surface, the scanning device scanning, on the surface, the laser beams emitted from the laser light sources to form an electrostatic latent image. The developing device develops the electrostatic latent image formed on the surface of the photosensitive member. The transferring device transfers an image developed by the developing device onto a recording medium.

BRIEF DESCRIPTION OF THE DRAWINGS

The above and other objects, features and advantages of the invention will become more apparent from reading the following description of the preferred embodiment taken in connection with the accompanying drawings in which:

FIGS. 9(a)–9(d) are explanatory diagrams illustrating how the laser beams LB1 and LB2 are irradiated on the light-receiving surface of the BD sensor, wherein FIG. 9(a) shows the state that the laser beams LB1 and LB2 are irradiated toward the receiving surface from the left side, FIG. 9(b) shows the state that the laser beam LB1 strikes the receiving surface first, FIG. 9(c) shows that both laser beams LB1 and LB2 are simultaneously irradiated on the receiving surface, and FIG. 9(d) shows that the laser beam LB1 is first to move past the receiving surface so that only the laser beam LB2 is irradiated onto the receiving surface.

DETAILED DESCRIPTION OF THE PREFERRED EMBODIMENTS

A multi-beam scanner and an image forming device according to a preferred embodiment of the present invention will be described while referring to the accompanying drawings wherein like parts and components are designated by the same reference numerals to avoid duplicating description.

FIG. 1 is a cross-sectional side view of a laser printer 1 according to the preferred embodiment of the present invention.

In the following description, the expressions "front", "rear", "upper", "lower", "right", and "left" are used to define the various parts when the laser printer 1 is disposed in an orientation in which it is intended to be used.

Figure 3:
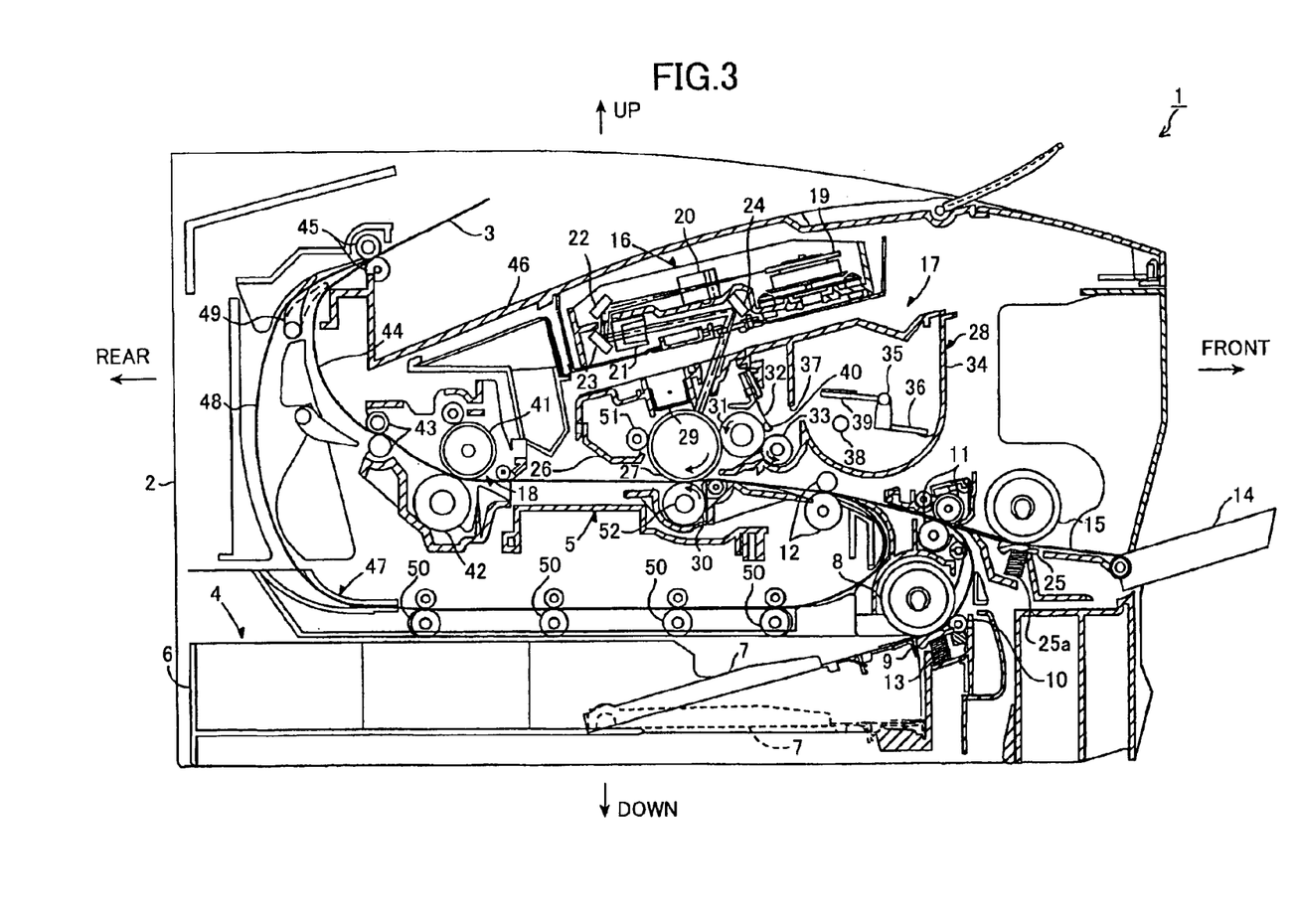
FIG. 3 is a side cross-sectional view showing the general structure of a laser printer according to the preferred embodiment of the present invention.

The laser printer 1 includes a main casing 2. The laser printer 1 further includes: a feeder section 4 and an image forming section 5. The feeder section 4 and the image forming section 5 are housed in the main casing 2. The feeder section 4 supplies sheets 3 (recording medium) to the image forming section 5. The image forming section 5 forms desired images on the supplied sheets 3.

The feeder section 4 includes: a paper supply tray 6, a paper pressing plate 7, a sheet supply roller 8, a separating pad 9, paper dust removing rollers 10 and 11, and registration rollers 12. The paper supply tray 6 is detachably mounted in the bottom section of the main casing 2. The paper pressing plate 7 is disposed inside the paper supply tray 6. The sheet supply roller 8 and the separating pad 9 are disposed above one end of the paper supply tray 6. The paper dust removing roller 10 and paper dust removing rollers 11 are disposed downstream of the sheet supply roller 8 in the conveying direction of the paper 3. The registration rollers 12 are disposed downstream of the paper dust removing roller 10 and the paper dust removing rollers 11 in the conveying direction of the paper 3.

A stack of sheets 3 can be mounted on the sheet pressing plate 7. The sheet pressing plate 7 is pivotably supported at its end furthest from the sheet supply roller 8 so that the end of the sheet pressing plate 7 that is the nearest to the sheet supply roller 8 can move vertically. Although not shown in the drawings, a spring for urging the sheet pressing plate 7 upward is provided to the rear surface of the sheet pressing plate 7. Therefore, the sheet pressing plate 7 pivots downward in accordance with increase in the amount of sheets 3 stacked on the sheet pressing plate 7. At this time, the sheet pressing plate 7 pivots around the end of the sheet pressing plate 7 farthest from the sheet supply roller 8, downward against the urging force of the spring.

The sheet supply roller 8 and the sheet supply pad 9 are disposed in confrontation with each other. A spring 13 is provided beneath the sheet supply pad 9 for pressing the sheet supply pad 9 toward the sheet supply roller 8. Urging force of the spring under the sheet pressing plate 7 presses the uppermost sheet 3 on the sheet pressing plate 7 toward the sheet supply roller 8. According to rotation of the sheet supply roller 8, the uppermost sheet 3 is sandwiched between the sheet supply roller 8 and the separation pad 13. Thereafter, one sheet 3 at a time is separated from the stack and supplied to the paper dust removing rollers 10, 11. The paper dust removing rollers 10, 11 remove paper dust from the supplied sheet 3 and further convey the sheet 3 to the registration rollers 12. The pair of registration rollers 12 performs a predetermined registration operation on the supplied sheet 3, and transport the sheet 3 to the image formation section 5.

The feeder section 4 further includes a multipurpose sheet supply mechanism. The multipurpose sheet supply mechanism includes: a multipurpose tray 14, a multipurpose sheet supply roller 15, and a multipurpose sheet supply-pad 25. The multipurpose sheet supply roller 15 and the multipurpose sheet supply pad 25 are disposed in confrontation with each other and are for supplying sheets 3 that are stacked on the multipurpose tray 14. A spring 25a provided beneath the multipurpose sheet supply pad 25 presses the multipurpose sheet supply pad 25 up toward the multipurpose sheet supply roller 15. Rotation of the multipurpose sheet supply roller 15 moves sheets 3 one at a time from the stack on the multipurpose tray 14 to a position between the multipurpose sheet supply pad 25 and the multipurpose sheet supply roller 15 so that the sheets 3 on the multipurpose tray 14 can be supplied one at a time to the image formation section 5.

The image forming section 5 includes: a multi-beam scanner 16, a process unit 17, and a fixing section 18.

The multi-beam scanner 16 is provided at the upper section of the casing 2 and is provided with a laser diode unit LD, a polygon mirror 19, an f θ lens 20, a cylinder lens 21, and reflection mirrors 22, 23, 24. The laser diode unit LD emits a plurality of (two, in this example) laser beams based on predetermined print data. As indicated by a chain line in FIG. 3, the laser beam passes through or is reflected by the polygon mirror 19, the f θ lens 20, the reflection mirrors 22 and 23, the cylinder lens 21, and the reflection mirror 24 in this order 90 as to irradiates in a high speed scanning operation, the surface of a photosensitive drum 27 in the process unit 17.

The process unit 17 is disposed below the scanner unit 16. The process unit 17 includes a drum cartridge 26. The drum cartridge 26 can be attached to and detached from the main casing 2. The drum cartridge 26 houses therein the photosensitive drum 27, a development cartridge 28, a scorotron charge unit 29, a transfer roller 30, and a conductive brush 51.

The development cartridge 28 is detachable from the drum cartridge 26 and is provided with a developing roller 31, a layer thickness regulating blade 32, a supply roller 33, and a toner box 34.

The toner box 34 is filled with positively charging, non-magnetic, single-component toner. In the present embodiment, polymerization toner is used as the toner. Polymerization toner has substantially spherical particles and so has an excellent fluidity characteristic. To produce polymerization toner, a polymerizing monomer is subjected to well-known copolymerizing processes, such as suspension polymerization. Examples of a polymerizing monomer include a styrene type monomer and an acrylic type monomer. An example of a styrene type monomer is styrene. Examples of acrylic type monomers are acrylic acid, alkyl (C1–C4) acrylate, and alkyl (C1–C4) metaacrylate. Because the polymerization toner has such an excellent fluidity characteristic, image development is reliably performed so that high-quality images can be formed. Materials such as wax and a coloring agent are distributed in the toner. The coloring agent can be carbon black, for example. In addition, external additive, such as silica, are added in the toner to further improve the fluidity characteristic. The toner has a particle diameter of about 6–10 $\mu$m.

A rotation shaft 35 is disposed in the center of the toner box 34. An agitator 36 is supported on the rotation shaft 35. The agitator 36 rotates and agitates the toner in the toner box 34 and discharges the toner through a toner supply opening 37 that is opened through the side wall of the toner box 34. A window 38 for detecting remaining toner is provided in each of two opposing end walls of the toner box 34. A cleaner 39 for cleaning the windows 38 is supported on the rotation shaft 35.

The supply roller 33 is located on the side of the toner supply opening 37. The developing roller 31 is located confronting the supply roller 33. The supply roller 33 and the developing roller 31 are provided rotatably. The supply roller 33 and the developing roller 31 are disposed in abutment contact with each other so that both are compressed to a certain extent.

The supply roller 33 includes a metal roller shaft covered with a roller formed from an electrically conductive sponge material.

The developer roller 31 includes a metal roller shaft and a roller portion covered thereon. The roller portion is made from a conductive rubber material. In more specific terms, the roller portion of the developing roller 31 is made from conductive silicone rubber or urethane rubber including, for example, carbon particles. The surface of the roller portion is covered with a coating layer of silicone rubber or urethane rubber that contains fluorine. The developing roller 31 is applied with a developing bias relative to the photosensitive drum 27.

The layer thickness regulating blade 32 is disposed near the developing roller 31. The layer thickness regulating blade 32 includes a blade made from a metal leaf spring, and has a pressing member 40, that is provided on a free end of the blade. The pressing member 40 has a semi-circular shape when viewed in cross section. The pressing member 40 is formed from silicone rubber with electrically insulating properties. The layer thickness regulating blade 32 is supported by the developing cartridge 28 at a location near the developing roller 31. The resilient force of the blade 32 presses the pressing member 40 against the surface of the developing roller 31.

The rotation of the supply roller 33 supplies the developing roller 31 with toner that has been discharged through the toner supply opening 37. At this time, the toner is triboelectrically charged to a positive charge between the supply roller 33 and the developing roller 31. Then, as the developing roller 31 rotates, the toner supplied onto the developing roller 31 moves between the developing roller 31 and the pressing member 40 of the layer thickness regulating blade 32. This further triboelectrically charges the toner, and reduces thickness of the toner on the surface of the developing roller 31 down to a thin layer of uniform thickness.

The photosensitive drum 27 is disposed-to the side of and in confrontation with the developing roller 31. The photosensitive drum 27 is supported rotatably. The photosensitive drum 27 includes a drum-shaped member and a surface layer. The drum-shaped member is electrically grounded. The surface layer is formed from a photosensitive layer that is made from polycarbonate and that has a positively charging nature.

The scorotoron charge unit 29 is disposed above the photosensitive drum 27 and is spaced away from the photosensitive drum 27 by a predetermined space so as to avoid direct contact with the photosensitive drum 27. The scorotron charge unit 29 is a positive-charge scorotron type charge unit for generating a corona discharge from a charge wire made from, for example, tungsten. The scorotoron, charge unit 29 forms a blanket of positive-polarity charge on the surface of the photosensitive drum 27,.

As the photosensitive drum 27 rotates, the scorotoron charge unit 29 first forms a blanket of positive charge on the surface of the photosensitive drum 27, and then the surface of the photosensitive drum 27 is exposed to high speed scan of the laser beam from the multi-beam scanner 16. The electric potential of the positively charged surface of the photosensitive drum 27 drops at positions exposed to the laser beam. As a result, an electrostatic latent image is formed on the photosensitive drum 27 based on print data.

Next, an inverse developing process is performed. That is, as the developing roller 31 rotates, the positively-charged toner borne on the surface of the developing roller 31 is brought into contact with the photosensitive drum 27. Because of the developing bias voltage applied to the developing roller 27, the toner on the developing roller 31 is supplied to lower-potential areas of the electrostatic latent image on the photosensitive drum 27. As a result, the toner is selectively borne on the photosensitive drum 27 so that the electrostatic latent image is developed into a visible toner image.

The transfer roller 30 is rotatably supported at a position below and in confrontation with the photosensitive drum 27. The transfer roller 30 is rotatably supported in the drum cartridge 26. The transfer roller 30 is of an ionic conductive type, and includes a metal roller shaft 52 and a roller portion covering the roller shaft 52. The roller portion is made from resilient member added with ionic material, such as lithium perchlorate. The transfer roller 30 has a resistance of about 107 to 108.5 ohms in the atmosphere of 22° C. and 50% RH. The transfer roller 30 can transfer the visible toner image borne on the surface of the photosensitive drum 27 to a sheet 3, while conveying the sheet 3 properly.

At times of toner image transfer, a transfer bias applying circuit (not shown) applies the transfer roller 30 with a predetermined transfer bias relative to the photosensitive drum 27. The visible toner image borne on the surface of the photosensitive drum 27 confronts the transfer roller 30 and is transferred onto a sheet 3 as the sheet 3 passes between the photosensitive drum 27 and the transfer roller 30.

The conductive brush 51 is provided to contact the surface of the photosensitive drum 27 at a position that is downstream of the transfer roller 30 and upstream of the scorotron charge unit 29 in the rotating direction of the photosensitive drum 27. The conductive brush 51 removes paper dust, which is attached to the photosensitive drum 27 after transfer operation has been executed.

The fixing section 18 is disposed to the side of the process unit 17 and downstream of the same in the conveying direction of the paper 3. The fixing section 18 includes a heating roller 41, a pressure roller 42 applying pressure to the heating roller 41, and transport rollers 43. The transport rollers 43 are disposed downstream of the heating roller 41 and the pressure roller 42.

The heating roller 41 is made of metal and encloses a halogen lamp (heater) therein. In the fixing section 18, the heat generated by the halogen lamp thermally fixes the toner, which has been transferred to the sheet 3 by the process unit 17, onto the sheet 3 while the sheet 3 passes through between the heating roller 41 and the pressure roller 42. Thereafter, the sheet 3 is transferred to a sheet discharging path 44 by the transport rollers 43. The sheet 3 transported to the sheet discharging path 44 is conveyed to discharge rollers 45, which in turn discharge the sheet 3 onto a discharge tray 46.

The laser printer 1 is further provided with an inverting transport section 47 for inverting sheets 3 that have been printed on once and for returning the sheets 3 to the image forming section 5 so that images can be formed on both sides of the sheets 3. The inverting transport section includes the sheet-discharge rollers 45, an inversion transport path 48, a flapper 49, and a plurality of inversion transport rollers 50.

The sheet-discharge rollers 45 are a pair of rollers that can be rotated selectively forward or in reverse. The sheet-discharge rollers 45 are rotated forward to discharge sheets 3 onto the sheet-discharge tray 46 and rotated in reverse when sheets 3 are to be inverted.

The inversion transport rollers 50 are disposed below the image forming section 5. The inversion transport path 48 extends vertically between the sheet-discharge rollers 45 and the inversion transport rollers 50. The upstream end of the inversion transport path 48 is located near the sheet-discharge rollers 45 and the downstream end is located near the inversion transport rollers 50 so that sheets 3 can be transported downward from the sheet-discharge rollers 45 to the inversion transport rollers 50.

The flapper 49 is swingably disposed at the junction between the sheet-discharge path 44 and the inversion transport path 48. By activating or deactivating a solenoid (not shown), the flapper 49 can be selectively swung between the orientation shown in broken line and the orientation shown by solid line in FIG. 3. The orientation shown in solid line in FIG. 3 is for transporting sheets 3 that have one side printed to the sheet-discharge rollers 45. The orientation shown in broken line in FIG. 3 is for transporting sheets from the sheet-discharge rollers 45 into the inversion transport path 48, rather than back into the sheet-discharge path 44.

The inversion transport rollers 50 are aligned horizontally at positions above the sheet supply tray 6. One pair of inversion transport rollers 50 that is farthest upstream is disposed near the rear end of the inversion transport path 48. Another pair of inversion transport rollers 50 that is located farthest downstream is disposed below the registration rollers 12.

The inverting transport unit 47 operates in the following manner when a sheet 3 is to be formed with images on both sides. A sheet 3 that has been formed on one side with an image is transported by the transport rollers 43 from the sheet-discharge path 44 to the sheet-discharge rollers 45. The sheet-discharge rollers 45 rotate forward with the sheet 3 pinched therebetween until almost all of the sheet 3 is transported out from the laser printer 1 and over the sheet-discharge tray 46. The forward rotation of the sheet-discharge rollers 45 is stopped once the rear-side end of the sheet 3 is located between the sheet-discharge rollers 45. Then, the sheet-discharge rollers 45 are driven to rotate in reverse while at the same time the flapper 49 is switched to change transport direction of the sheet toward the inversion transport path 48. As a result, the sheet 3 is transported into the inversion transport path 48 with its leading and trailing ends being reversed from the original state. The flapper 49 reverts to its initial position once transport of the sheet 3 to the inversion transport path 48 is completed. That is, the flapper 49 switches back to the position for transporting sheets from the transport rollers 43 to the sheet-discharge rollers 45. Next, the inverted sheet 3 is transported through the inversion transport path 48 to the inversion transport rollers 50 and then from the inversion transport rollers 50 to the registration rollers 12. The registration rollers 12 align the front edge of the sheet 3. Afterward, the sheet 3 is transported toward the image formation section 5. At this time, the upper and lower surfaces of the sheet 3 are reversed from the first time that an image has been formed on the sheet 3 so that an image can be formed on the other side as well. In this way, images are formed on both sides of the sheet 3.

The laser printer 1 uses the developing roller 31 to collect residual toner that remains on the surface of the photosensitive drum 27 after toner is transferred onto the sheet 3 via the transfer roller 30. In other words, the laser printer 1 uses a "cleanerless development method" to collect the residual toner. By using the cleanerless development method to collect residual toner, there is no need to provide a separate member, such as a blade, for removing the residual toner or an accumulation tank for the waste toner. Therefore, the configuration of the laser printer can be simplified.

Figure 4:
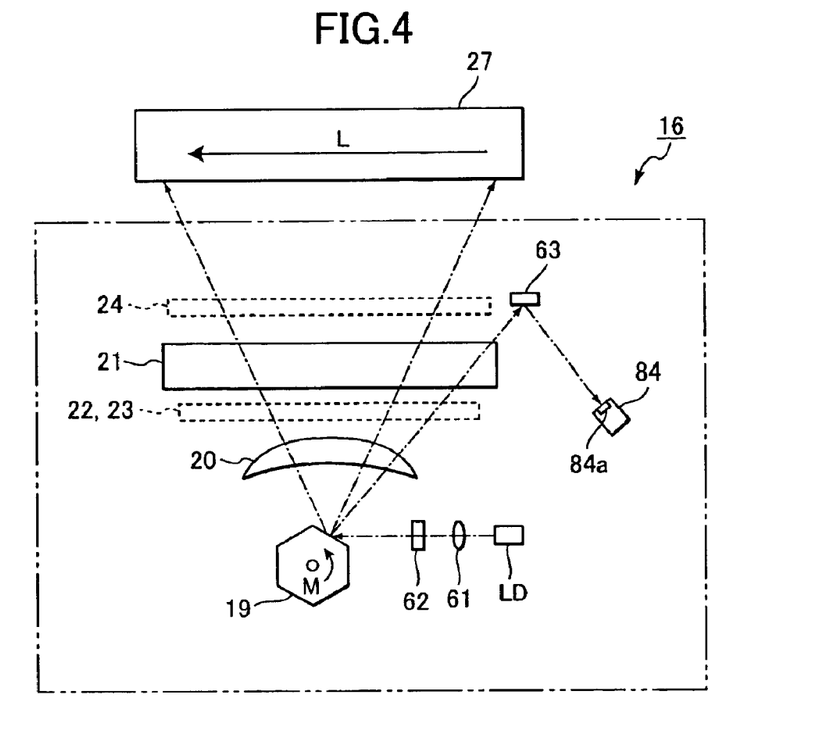
FIG. 4 is a plan view showing the general structure of a multi-beam scanner according to the preferred embodiment of the present invention.

Next, the multi-beam scanner 16 for scanning laser beams over the surface of the photosensitive drum 27 will be described with reference to FIG. 4. FIG. 4 is a plan view showing the general structure of the multi-beam scanner 16. In order to describe the general structure and operations of the multi-beam scanner 16, the plan view of FIG. 4 indicates each component within a plane following the path of the laser beams.

As shown in FIG. 4, the multi-beam scanner 16 of the preferred embodiment is provided with a laser diode unit LD, which serves as a source of the laser beams. Each laser beam emitted from the laser diode unit LD is converted to a parallel ray by a collimator lens 61 and is subsequently narrowed in the auxiliary scanning direction by a cylinder lens 62 to be imaged on the side surface of the polygon mirror 19.

The polygon mirror 19 is rotated by a motor (not shown) at a high speed in the direction indicated by an arrow M. The angle of the laser beam changes by the rotations of the polygon mirror 19, causing the laser beam to be scanned over the surface of the photosensitive drum 27 at regular time intervals in a main scanning direction (the direction indicated by an arrow L). The laser beam reflected off the polygon mirror 19 undergoes distortion aberration correction by the fθ lens 20, is reflected by the reflecting mirrors 22 and 23 (see FIG. 3) and is narrowed in the auxiliary scanning direction by the lens 21. The laser beam produced from the lens 21 is reflected off the reflecting mirror 24 and is irradiated on the photosensitive drum 27 disposed outside the multi-beam scanner 16.

Further, a reflecting mirror 63 is disposed at a prescribed position in the overall scanning range that includes the photosensitive drum 27. When the laser beam reflected off the polygon mirror 19 is irradiated on the reflecting mirror 63, the laser beam is reflected off the reflecting mirror 63 onto a receiving surface 84a of a BD sensor 84. The reflecting mirror 63 is disposed in a position so that the reflecting mirror 63 is irradiated by the laser beam in each scan by the polygon mirror 19 within a time interval from the start of the scan until the laser beam starts scanning the photosensitive drum 27.

It is noted that the configuration of FIG. 4 is simply one example. Instead of reflecting the laser beam off the reflecting mirror 63, it is obvious that the BD sensor 84 may be placed in the position of the reflecting mirror 63 to receive the light directly from the polygon mirror 19.

Figure 7:
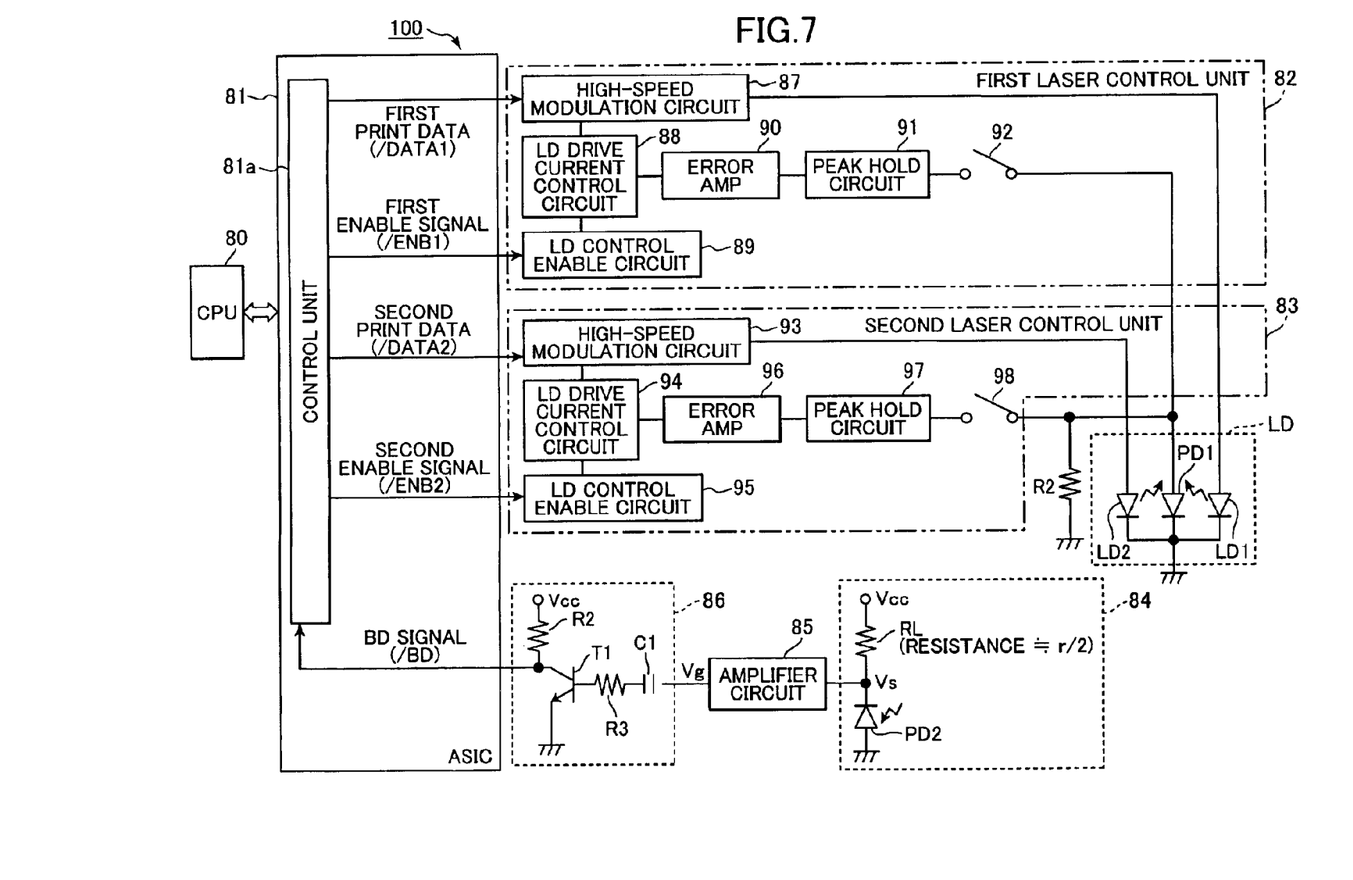
FIG. 7 is a block diagram showing the general configuration of a laser controller according to the preferred embodiment.

The BD sensor 84 is provided with an internal photodiode PD2, shown in FIG. 7, for outputting a signal corresponding to the total amount of the laser light that the receiving surface 84a receives. The BD sensor 84 is provided for detecting the laser beam before the beam scans the photosensitive drum 27 in order to acquire a synchronization signal (BD signal) indicating the start of a scan.

As shown in FIG. 7, the laser diode unit LD includes a laser device having two laser light sources (two semiconductor lasers). The two semiconductor lasers include: a first semiconductor laser LD1, and a second semiconductor laser LD2. The laser diode unit LD1 further includes a photodiode PD1 (see FIG. 7) for detecting back beams from the two semiconductor lasers LD1 and LD2. Two lines of beams are irradiated on the photosensitive drum 27 by the laser beams emitted from the two semiconductor lasers LD1 and LD2 in synchronization with the LD signal. The construction of the laser diode unit LD is shown in FIG. 5.

Figure 5:
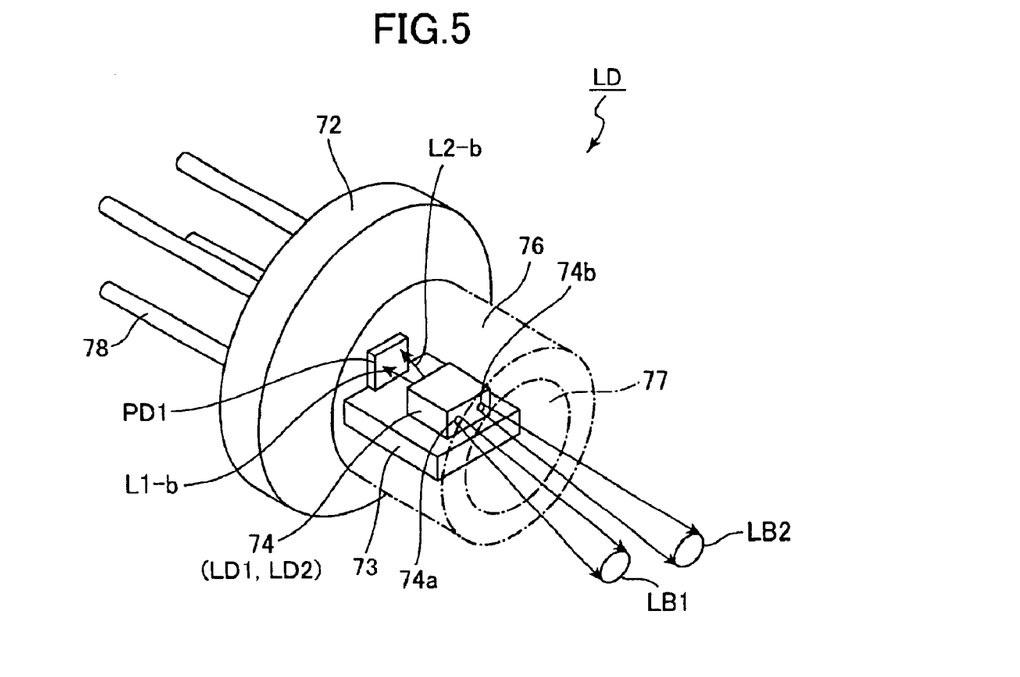
FIG. 5 is a perspective view showing the general structure of a laser diode according to the preferred embodiment.

As shown in FIG. 5, the laser diode unit LD includes a stem 72. A base 73 is provided on one surface of the stem 72. A laser device 74 (laser chip) and the photodiode PD1 are fixed above the base 73. The two semiconductor lasers LD1 and LD2 are formed inside the laser device 74. The laser device 74 has light emitting points 74a and 74b. The first semiconductor laser LD1 emits a laser beam LB1 from the light emitting point 74a, while the second semiconductor laser LD2 emits a laser beam LB2 from the light emitting point 74b.

A cap 76 is mounted on the stem 72 so as to cover the base 73 and the laser device 74 and photodiode PD1 mounted thereon. A window 77 is formed in the front end of the cap 76 to allow passage of the laser beams LB1 and LB2 (front beams). Back beams L1-b and L2-b produced by the laser device 74 are received by the photodiode PD1. Electrically conductive terminals 78 are provided on the surface of the stem 72 opposite the base 73 for connecting the laser device 74 and the photodiode PD1 to a laser controller 100 (see FIG. 7).

Next, the relative positions of beam spots irradiated by the laser beams LB1 and LB2 on targets will be described with reference to FIG. 6. In this example, the laser diode unit LD irradiates the laser beams LB1 and LB2 on the photosensitive drum 27 and the reflecting mirror 63 as the targets.

Figure 6:
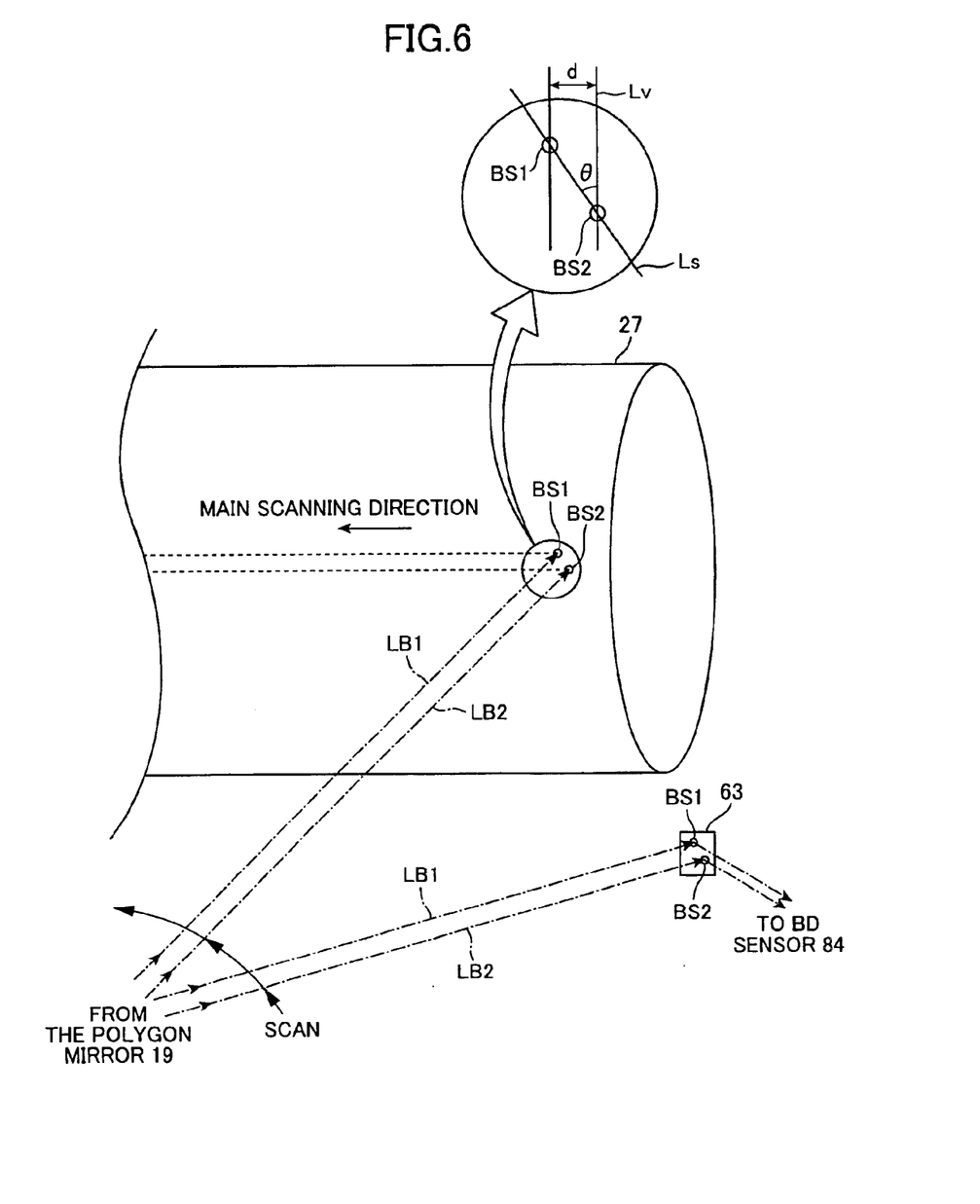
FIG. 6 is an explanatory diagram illustrating the relative positions of beam spots irradiated on targets by laser beams LB1 and LB2.

As shown in FIG. 6, the polygon mirror 19 scans the laser beams LB1 and LB2 emitted from the laser diode unit LD in a main scanning direction, so that the laser beams LB1 and LB2 are irradiated on the reflecting mirror 63 at prescribed timing directly after the beginning of a scanning cycle. Light reflected off the reflecting mirror 63 is received by the receiving surface 84a of the BD sensor 84. The receiving surface 84a is configured to receive the two laser beams LB1 and LB2 simultaneously. After being irradiated on the reflecting mirror 63, the laser beams LB1 and LB2 continue moving in the main scanning direction and are irradiated on a prescribed image-forming region of the photosensitive drum 27 (the region that is exposed to attract developer).

At this time, the laser beams LB1 and LB2 irradiated on the target (reflecting mirror 63 or photosensitive drum 27) form beam spots BS1 and BS2, respectively, on the target at positions separated by a prescribed distance d in the main scanning direction. In other words, the center points of the beam spots BS1 and BS2 are never positioned simultaneously on a single vertical line Lv perpendicular to the main scanning direction, but are simultaneously positioned on a slanted line Ls that is inclined at a predetermined angle θ (0°<θ<90°) to the vertical line Lv. The beam spot BS1 is formed by the laser beam LB1, while the beam spot BS2 is formed by the laser beam LB2.

Figure 9A:
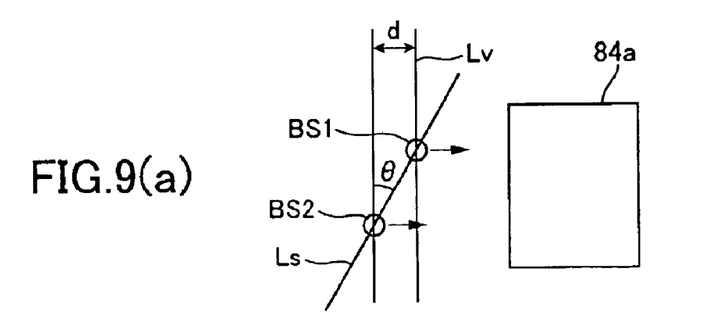
Figure 9B:
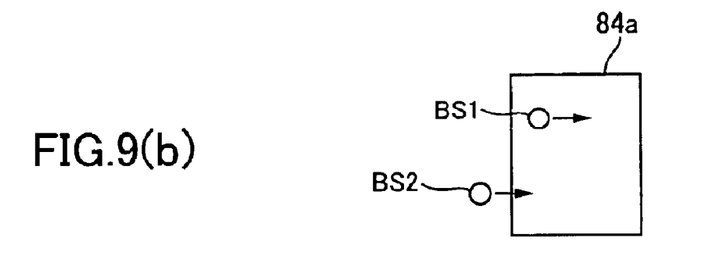
Figure 9C:
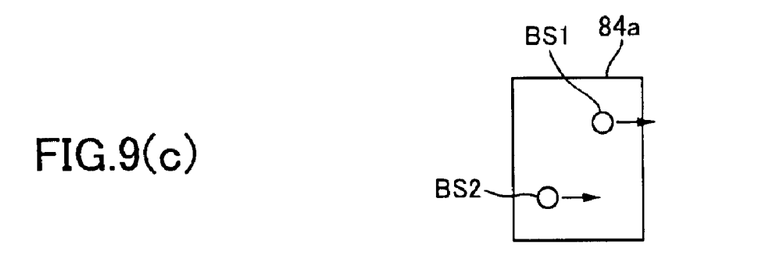
Figure 9D:
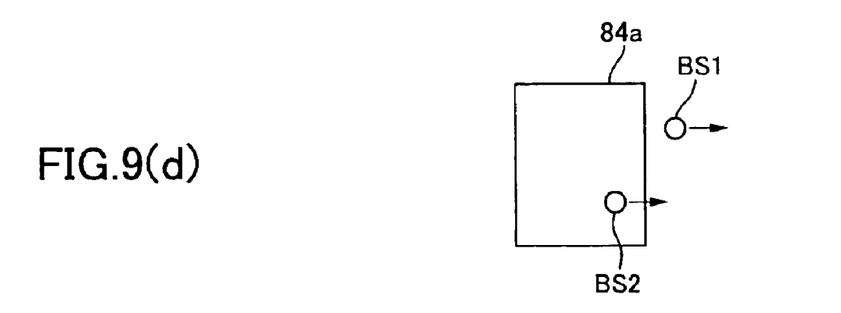

Accordingly, the laser beams LB1 and LB2 are irradiated onto the receiving surface 84a of the BD sensor 84 at timings offset from each other, as illustrated in FIGS. 9(a)–9(d). In the preferred embodiment, the laser beats are irradiated toward the receiving surface 84a from the left side (FIG. 9(a)) so that the laser beam LB1 strikes the receiving surface 84a first (FIG. 9(b)). As shown in FIG. 9(b), only the laser beam LB1 is irradiated onto the receiving surface 84a, generating the beam spot BS1. The laser beam LB2 has not yet been irradiated on the receiving surface 84a. As the laser beams continue advancing in the main scanning direction, the laser beam LB2 is also irradiated onto the receiving surface 84a, an shown in FIG. 9(c). At this time, both laser beams LB1 and LB2 are simultaneously irradiated on the receiving surface 84a. As the laser beams continue to advance from this point, the laser beam LB1 is first to move past the receiving surface 84a so that only the laser beam LB2 is irradiated onto the receiving surface 84a, as shown in FIG. 9(d).

The multi-beam scanner 16 may be configured to form the two beam spots BS1 and BS2 on the photosensitive drum 27 or the receiving surface 84a so that the beam spots are separated by a prescribed distance d in the main scanning direction by locating the laser diode unit LD in an orientation that produces the thus offset laser beams. Alternatively, the laser beams LB1 and LB2 may be adjusted optically by disposing lenses, reflecting mirrors, or the like between the laser diode unit LD and the target of irradiation (photosensitive drum 27 or the receiving surface 84a) to achieve the same effect. Further, it is not necessary for the distance d on the photosensitive drum 27 (FIG. 6) to be equivalent to the distance d on the receiving surface 84a (FIG. 9(a)). These two distances may differ from each other according to differences in the optical path to the photosensitive drum 27 and the optical path to the receiving surface 84a.

Next, drive control for the two semiconductor lasers LD1 and LD2 will be described with reference to FIG. 7. FIG. 7 is a block diagram showing the general structure of the laser controller 100 provided in the laser printer 1 according to the preferred embodiment. The laser controller 100 includes a CPU 80 for controlling the overall operations; an ASIC 81 for generating and outputting various control signals based on commands received from the CPU 80 in order to control the supply of electricity to the semiconductor lasers LD1 and LD2; a first laser control unit 82 for controlling the supply of electricity to the first semiconductor laser LD1 in the laser diode unit LD; a second laser control unit 83 for controlling the supply of electricity to the second semiconductor laser LD2 in the laser diode unit LD; the BD sensor 84 for outputting a sensor signal Vs corresponding to the total amount of received light, an amplifier circuit 85, and an AD conversion circuit 86.

As shown in FIG. 7, the cathodes of the semiconductor lasers LD1 and LD2 and the photodiode PD1 are all grounded. The anode of the first semiconductor laser LD1 is connected to a high-speed modulation circuit 81 in the first laser control unit 82. The anode of the second semiconductor laser LD2 is connected to a high-speed modulation circuit 93 in the second laser control unit 83. The anode of the photodiode PD1 is connected to a switch 92 in the first laser control unit 82, a switch 98 in the second laser control unit 83, and a ground potential via a resistor R1.

A BD signal output circuit 101 is constructed from the BD sensor 84, amplifier circuit 85, and AD conversion circuit 86. The BD signal output circuit 101 is identical in configuration to the conceivable BD signal output circuit 200 shown in FIG. 1, except for the resistance value of the load resistor RL (load resistance) provided in the BD sensor 84. Accordingly, the components in this BD signal output circuit 101 are provided with the same reference numerals with the components in the conceivable BD signal output circuit 200 of FIG. 1 to avoid duplicating description.

While the load resistance in the example of FIG. 1 is r, the load resistance in the preferred embodiment is approximately r/2. However, despite setting the load resistance to approximately one-half the resistance in the conceivable circuit 200, the PP voltage Vsp-p of the sensor signal Vs obtained in the preferred embodiment is at nearly the same level as that in the conceivable circuit 200 of FIG. 1 because the amount of light received in the present embodiment is nearly twice the amount of light received in the circuit 200 of FIG. 1.

Specifically, one laser beam is used in the example of FIG. 1, and the load resistance is set to r so that the transistor T1 is turned on and a BD signal is outputted when a single laser beam is received. However, in the preferred embodiment, the circuit 101 is configured so that the transistor T1 is turned on and the BD signal is outputted when both laser beams LB1 and LB2 are received by the photodiode PD2 simultaneously, as indicated in FIG. 19(c). Accordingly, the load resistance can be reduced to about one-half the r value.

More specifically, if the load resistance were set to r in the preferred embodiment, then the PP voltage Vsp-p of the sensor signal Vs would be approximately twice the PP voltage Vsp-p in FIG. 1 (see FIG. 2). Therefore, the PP voltage Vsp-p in the preferred embodiment can be set to approximately the same level as that in the conceivable circuit 200 by setting the load resistance to approximately one-half, thereby improving the response to the amount of received light.

In the AD conversion circuit 86, the transistor T1 is turned on when the amplified sensor signal Vg from the amplifier circuit 85 becomes greater than or equal to the prescribed threshold level Vth, resulting in the output of a BD signal (/BD signal, where "/" indicates negative logic). The /BD signal is inputted into a control unit 81a in the ASIC 81 for synchronizing various control processes in the control unit 81a.

The control unit 81a of the ASIC 81 controls the supply of electricity to (turns on/off) the semiconductor lasers LD1 and LD2 by controlling the first laser control unit 82 and the second laser control unit 83 according to commands received from the CPU 80. First, the first laser control unit 82 that controls the supply of electricity to the first semiconductor laser LD1 will be described.

As shown in FIG. 7, the first laser control unit, 82 includes an LD drive current control circuit 88 for controlling the value of a current supplied to the first semiconductor laser LD1; the high-speed modulation circuit 87 for performing high-speed modulation of the supply current supplied to the first semiconductor laser LD1 at the value regulated by the LD drive current control circuit 88 according to a first print data (/DATA1) received from the control unit 81a; an LD control enable circuit 89 for outputting a signal to enable or disable the supply of electricity to the first semiconductor laser LD1 according to a first enable signal (/ENB1 signal) received from the control unit 81a; the switch 92 for forming or breaking an electrical connection between the anode of the photodiode PD1 and a peak hold circuit 91; the peak hold circuit 91 for holding the peak value of the voltage signal outputted from the photodiode PD1 when the switch 92 is on; and an error amplifier 90 for amplifying the difference between the peak value maintained by the peak hold circuit 91 and a prescribed reference voltage Vref.

When a low level /ENB1 signal is inputted from the control unit 81a, the LD control enable circuit 89 outputs a signal to the LD drive current control circuit 88 for enabling the supply of electricity to the first semiconductor laser LD1. Upon receiving this signal, the LD drive current control circuit 88 begins supplying an electrical current according to the signal received from the error amplifier 90 to the first semiconductor laser LD1. Specifically, the value of the supply current is controlled to achieve an output of zero from the error amplifier 90 (in other words, to keep the peak value maintained by the peak hold circuit 91 equivalent to the reference voltage Vref in the error amplifier 90) in order to maintain the laser beam emitted from the first semiconductor laser LD1 at a constant power. This is referred to as automatic power control (APC). However, electricity is not supplied to the first semiconductor laser LD1 if the /DATA1 signal is at high level (that is, when there is no print data), even when the /ENB1 signal is at low level.

The peak hold circuit 91 has a common construction that includes two voltage follower circuits for converting between input and output impedances and a capacitor connected between the voltage follower circuits for holding the peak value. However, the peak hold circuit 91 in the preferred embodiment additionally includes a discharge circuit having resistors and the like for gradually discharging the capacitor so that the exact charge voltage of the capacitor (peak value) is not constantly maintained. This configuration is employed for the following reason. If a discharge circuit were not provided and the peak value were maintained indefinitely, values inputted into the peak hold circuit 91 after a larger peak value has been held by the peak hold circuit 91 will not be held. By providing the discharge circuit, a peak value, that is, a charge voltage of the capacitor held at a certain timing will gradually drop when the switch 92 is turned off. Hence, voltages outputted from the photodiode PD1 after the switch 92 is turned on again will be held as the peak value, provided that the output voltage is not lower than the charge voltage of the capacitor.

The switch 92 is controlled by a control signal from the control unit 81a to turn on when the first semiconductor laser LD1 is illuminated and controlled by APC, enabling output signals from the photodiode PD1 to be inputted into the peak hold circuit 91. The switch 9B provided in the second laser control unit 83 described later is also controlled by a control signal from the control unit 81a to turn on when the second semiconductor laser LD2 is illuminated and controlled through APC, enabling output signals from the photodiode PD1 to be inputted into a peak hold circuit 97. In this way, a signal corresponding to the is amount of light emitted from the first semiconductor laser LD1 is inputted into the peak hold circuit 91 of the first laser control unit 82, while a signal corresponding to the amount of light emitted from the second semiconductor laser LD2 is inputted into the peak hold circuit 97 of the second laser control unit 83.

The error amplifier 90 is an amplifier well known in the art for amplifying the difference between the peak value received from the peak hold circuit 91 and the prescribed reference voltage Vref. However, rather than fixing the reference voltage to a constant Vref value, the reference voltage in the preferred embodiment is configured to gradually increase from zero to Vref when initially supplying electricity to the first semiconductor laser LD1 at the beginning of a printing process. This is because an excessive inrush current that can damage the first semiconductor laser LD1 may flow to the first semiconductor laser LD1 when initially supplying electricity if the reference voltage were constantly fixed to Vref. The reference voltage Vref is set such that the first semiconductor laser LD1 produces a laser beam of a prescribed light amount sufficient for reliably forming electrostatic latent images on the surface of the photosensitive drum 27.

The second laser control unit 83 is for controlling the current supplied to the second semiconductor laser LD2, and has a configuration basically the same as that of the first laser control unit 82. Specifically, the second laser control unit 83 includes an LD drive current control circuit 94 for controlling the value of a current supplied to the second semiconductor laser LD2; a high-speed modulation circuit 93 for performing high-speed modulation of the supply current supplied to the second semiconductor laser LD2 at the value regulated by the LD drive current control circuit 94 according to a second print data (/DATA2) received from the control unit 81a; an LD control enable circuit 95 for outputting a signal to enable or disable the supply of electricity to the second semiconductor laser LD2 according to a second enable signal (/ENB2 signal) received from the control unit 81a; the switch 98 for forming or breaking an electrical connection between the anode of the photodiode PD1 and a peak hold circuit 97; the peak hold circuit 97 for holding the peak value of the voltage signal outputted from the photodiode PD1 when the switch 98 is on; and an error amplifier 96 for amplifying the difference between the peak value maintained by the peak hold circuit 97 and the prescribed reference voltage Vref.

When a low level /ENB2 signal is inputted from the control unit 81a, the LD control enable circuit 95 outputs a signal to the LD drive current control circuit 94 for enabling the supply of electricity to the second semiconductor laser LD2. Upon receiving this signal, the LD drive current control circuit 94 begins supplying an electrical current according to the signal received from the error amplifier 96 to the second semiconductor laser LD2. Specifically, the value of the supply current is controlled to achieve an output of zero from the error amplifier 96 (in other words, to keep the peak value maintained by the peak hold circuit 97 equivalent to the reference voltage Vref in the error amplifier 96) in order to maintain the laser beam emitted from the second semiconductor laser LD2 at a constant power. This is referred to also as automatic power control (APC). However, electricity is not supplied to the second semiconductor laser LD2 it the /DATA2 signal is at high level (that is, when there is no print data), even when the /ENB2 signal is at low level. The peak hold circuit 97 and the error amplifier 96 have the same configurations with the peak hold circuit 91 and the error amplifier 90, respectively.

Next, a description will be given for operations performed by the laser controller 100 according to the preferred embodiment, shown in FIG. 1, for controlling the semiconductor lasers LD1 and LD2. For example, when print data created on a terminal device such as a personal computer (not shown) is transmitted along with a print command to the laser printer 1, the CPU 80 rasterizes this print data and outputs the rasterized data to the control unit 81a. Based on this data, the control unit 81a outputs the first and second print data (/DATA1, /DATA2). However, the control unit 81a cannot simply output the first and second print data immediately after beginning the supply of electricity to the semiconductor lasers LD1 and LD2. The control unit 81a has to wait until the laser beams emitted from the semiconductor lasers LD1 and LD2 have reached an amount sufficient for forming electrostatic latent images on the surface of the photosensitive drum 27 and until a synchronization signal (/BD signal) has been acquired before actually outputting the first and second print data.

Figure 8:
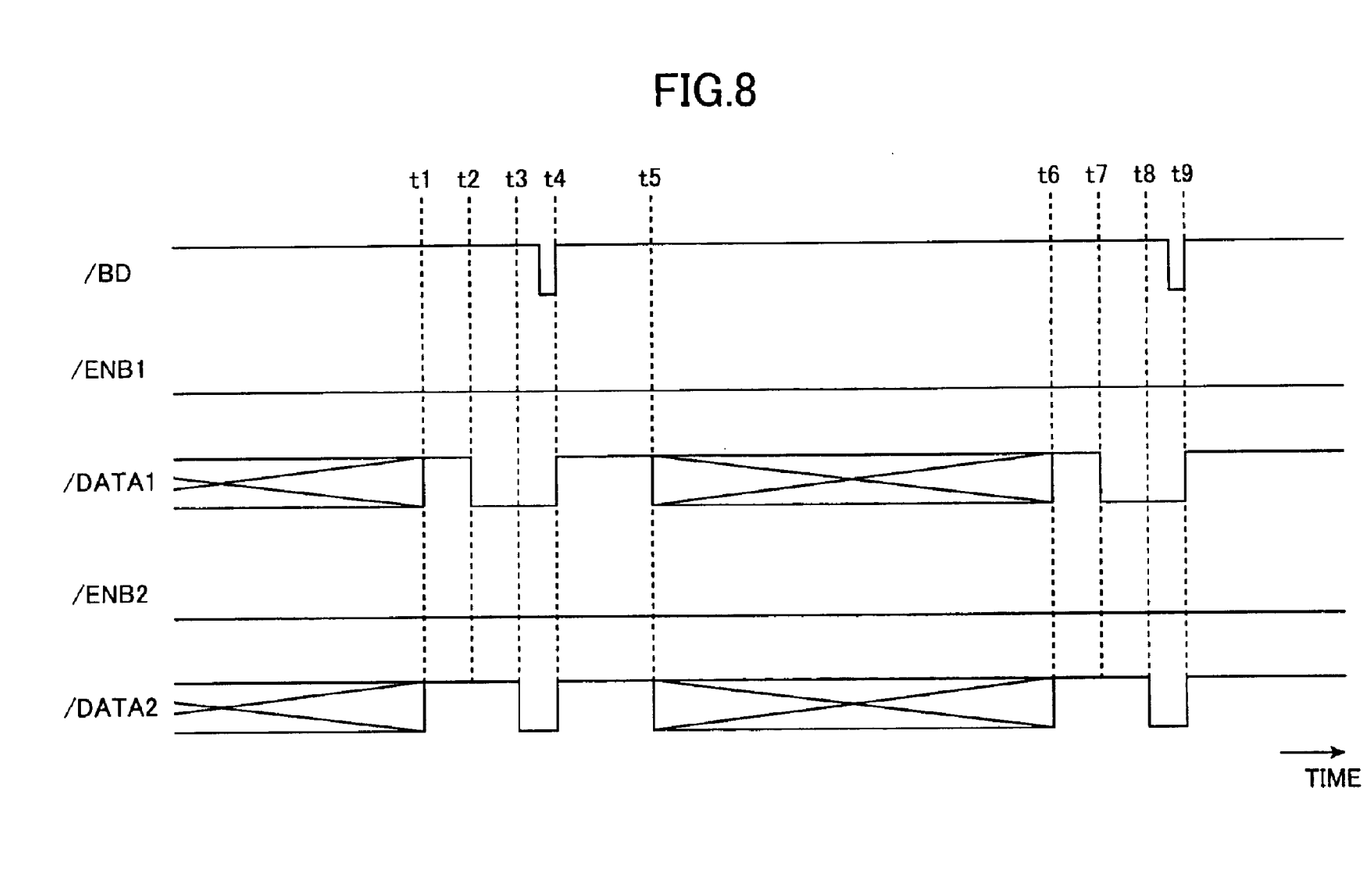
FIG. 8 is a timing chart illustrating operations for controlling semiconductor lasers LD1 and LD2 according to the laser controller of the preferred embodiment.

FIG. 8 is a timing chart illustrating the operations performed by the laser controller 100 according to the preferred embodiment for controlling the semiconductor lasers LD1 and LD2. As shown in the drawing, the semiconductor lasers LD1 and LD2 irradiate the laser beams LB1 and LB2 based on the corresponding first and second print data (/DATA1 signal, /DATA2 signal) while scanning the surface of the photosensitive drum 27. After the semiconductor lasers LD1 and LD2 have completed a scan over the photosensitive drum 27 (t1) and after a prescribed time has elapsed, the control unit 81a outputs a low level /DATA1 signal at a timing t2. This /DATA1 signal is dummy data used for APC control or BD signal detection.

At a timing t3 the control unit 81a outputs a low level /DAT2 signal (dummy data) so that both the semiconductor lasers LD1 end LD2 are emitting laser beams. The scanning continues until both the laser beams LB1 and LB2 are irradiated on the receiving surface 84a simultaneously, as shown in FIG. 9(c), at which time a BD signal is outputted. Hence, a low level /BD signal is inputted into the control unit 81a of the ASIC 81.

When the control unit 81a detects the output of a BD signal at the time the /BD signal drops to low level, the control unit 81a turns off (high level) both the /DATA1 and /DATA2 signals, as well as output of the LBD signal, at a timing t4. When the laser beams LB1 and LB2 are subsequently scanned to a prescribed start position for exposing the photosensitive drum 27 (t5), the laser beams are again irradiated onto the photosensitive drum 27 based on the first and second print data (/DATA1 signal, /DATA2 signal). Timings t6–t9 are identical to t1–t4 described above. In this way, the BD signal is detected on each scanning cycle.

Next, the process from t3 in the timing chart of FIG. 8, when laser beams are emitted from both the semiconductor lasers LD1 and LD2 until a BD signal (low level /BD signal) is outputted, will be described in detail with reference to FIG. 10. For the sake of simplicity, the laser beams LB1 and LB2 in FIG. 10 are continuously emitted from the semiconductor lasers LD1 and LD2 while being scanned in the manner shown in FIGS. 9(a)–(d).

Figure 10:
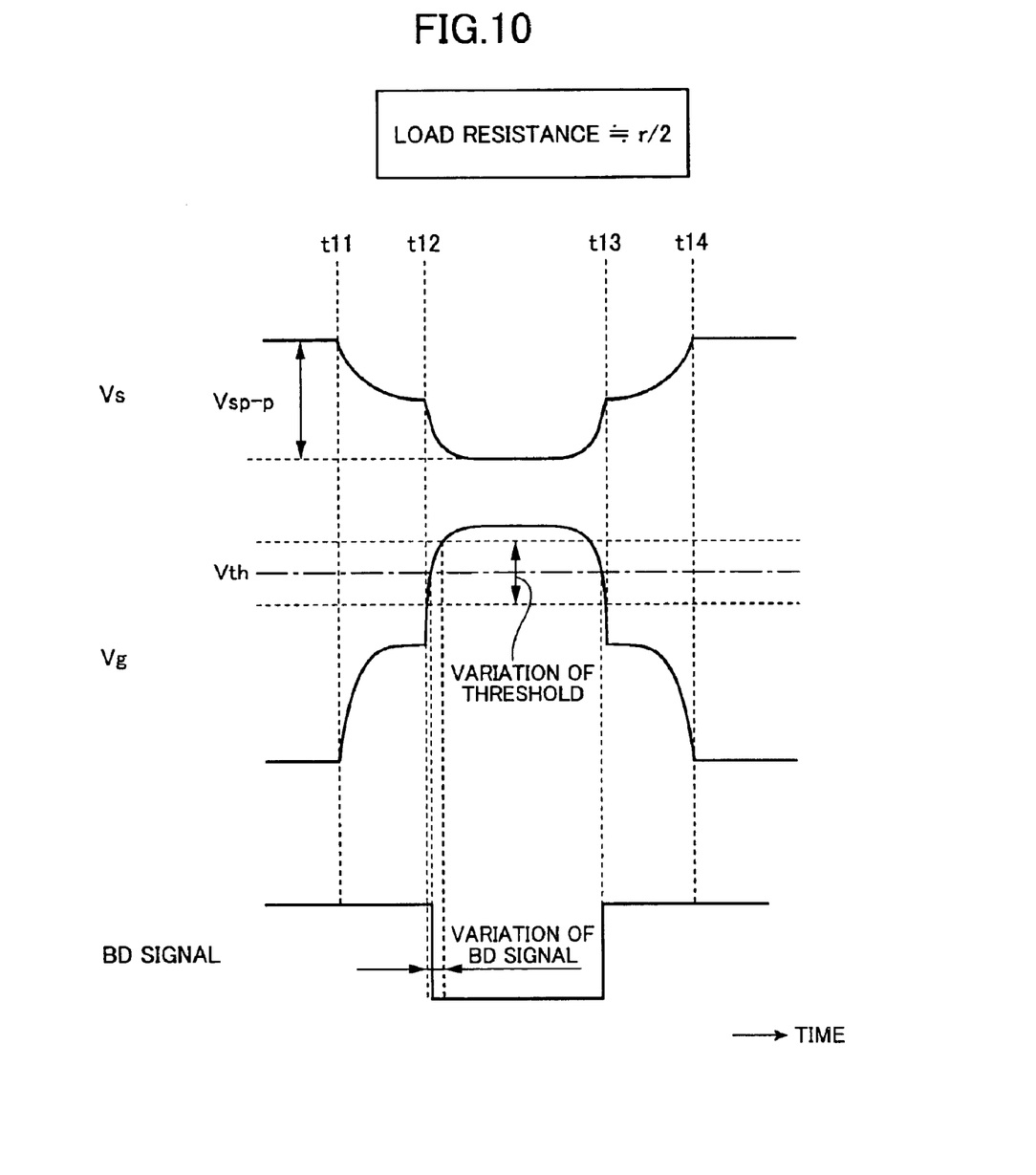
FIG. 10 is a timing chart illustrating the output of BD signals over time according to the preferred embodiment.

In the time interval prior to a timing t11 in FIG. 10, neither the laser beam LB1 nor the laser beam LB2 is irradiated on the receiving surface 84a of the BD sensor 84 (see FIG. 9(a)). After t11, only the laser beam LB1 from the first semiconductor laser LD1 is irradiated on the receiving surface 84a, causing the sensor signal Vs to drop and the amplified sensor signal Vg to increase (see FIG. 9(b). As the scanning continues to a timing t12, the laser beam LB2 from the second semiconductor laser LD2 also comes to be irradiated on the receiving surface 84a. Hence, as shown in FIG. 9(c), both the laser beams LB1 and LB2 are simultaneously irradiated on the receiving surface 84a. At this time, the sensor signal Vs drops further and the amplified sensor signal Vg increases further. When the amplified sensor signal Vg becomes greater than or equal to the threshold level Vth, the transistor T1 in the AD conversion circuit 86 turns on, and the /BD signal switches to low level.

After the laser beam LB1 goes out of the receiving surface 84a, as shown in FIG. 9(d), the sensor signal Vs rises again, causing the amplified sensor signal Vg to drop below the threshold level Vth. As a result, the /BD signal is switched to high level. At a timing t13 the laser beam LB2 also goes out of the receiving surface 74a, and from a timing t14 the light amount received by the receiving surface 84a is zero.

Therefore, in the preferred embodiment, the BD signal is outputted when both the laser beams LB1 and LB2 are irradiated on the receiving surface 84a simultaneously with this configuration, variations in the BD signal output timing are slight, as shown in FIG. 10, even when there is some variation in the threshold level Vth. Therefore, the variations have little effect on the printing results.

As described above, the PP voltage Vsp-p of the sensor signal Vs in FIG. 10 is nearly identical to the PP voltage Vsp-p in the conceivable device 200 shown in FIG. 2. Hence, the PP voltage Vsp-p in the preferred embodiment remains equivalent to that in the conceivable circuit 200, while the load resistance is reduced to about half. By setting the load resistor RL in the circuit 101 of the present embodiment to a resistance lower than that in the conceivable circuit 200 of FIG. 1, the response of the BD sensor 84 in the present embodiment to changes in amounts of received light becomes higher than that in the conceivable circuit 200.

According to the present embodiment, the BD sensor 84 includes a series circuit having the resistor RL and the photodiode PD2 (photoelectric converting element), which are connected with each other in series. The constant voltage bias Vcc is applied to the series circuit 80 that a potential at a contact point between the resistor RL and the photodiode PD2 decreases in response to an increase in the amount of light received by the photodiode PD2. The amplifier circuit 85 inverts the change in potential at the contact point between the resistor RL and the photodiode PD2 to cause the potential to increase in response to an increase in the amount of the light received by the photodiode PD2. The amplifier circuit 85 outputs the inverted potential as the sensor amplification signal Vg. The resistor RL has a resistance value that allows, when the photodiode PD2 receives two laser beams simultaneously, the amplifier circuit 85 outputs the sensor amplification signal Vg whose value is greater than or equal to the threshold level Vth, and that allows, when the photodiode PD2 receives only one laser beam, the amplifier circuit 85 outputs the sensor amplification signal vg whose value is smaller than the threshold level Vth. In other words, the resistor RL has a resistance value that allows, when the photodiode PD2 receives two laser beams simultaneously, the amplifier circuit 85 to output the sensor amplification signal Vg whose value is greater than or equal to the threshold level Vth, and that is smaller than such a resistance value that is required to allow, when the photodiode PD2 receives only one laser beam, the amplifier circuit 85 to output the sensor amplification signal Vg whose value is equal to the threshold level Vth.

In the multi-beam scanner of the preferred embodiment, the level of the sensor amplification signal Vg increases along with increases in the amount of received light. Further, if the amount of received light is fixed, then the level of the sensor amplification signal Vg increases as the resistance value of the resistor RL in the BD sensor 84 increases. However, as described above, as the resistance value increases, the speed (response), in which the potential at the contact point between the resistor R1 and the photodiode PD2 changes in response to changes in the amount of received light, decreases and consequently reduces the response of the sensor amplification signal Vg to the amount of received light.

Therefore, the resistance value (r/2) is set in the BD sensor 84 so that the signal Vg becomes greater than or equal to the threshold level vth when the BD sensor 84 receives the two laser beams simultaneously. The resistance value (r/2) is set smaller than the value (r) that is required to obtain a signal Vg whose amount becomes greater than or equal to the threshold level Vth when one laser beam is received.

Hence, the resistance value (r/2) of the resistor RL is set to cause the level of the signal Vg to become greater than or equal to the threshold level vth when the BD sensor 84 receives two laser beams simultaneously and smaller than the value (r) that is required to obtain a signal Vg whose amount is greater than or equal to the threshold level Vth when the BD sensor 84 receives only a single laser beam, thereby improving the response to changes in amounts of received light.

In the multi-beam scanner 16 of the preferred embodiment described above, the two laser beams LB1 and LB2 are sequentially irradiated on the receiving surface 84a and detected by the photodiode PD2, and a BD signal (low level /BD signal) is outputted when the laser beams LB1 and LB2 are simultaneously irradiated on the receiving surface 84a. When the laser beams LB1 and LB2 are simultaneously received on the receiving surface 84a, the transistor T1 is turned on and the BD signal is outputted. Accordingly, the resistance value of the load resistor RL in the SD sensor 84 is reduced to approximately half the r in the conceivable circuit 200, while the PP voltage Vsp-p is kept equivalent to that in the conceivable circuit 200.

Therefore, it is possible to increase the response of the SD sensor 84, that is, to increase the speed at which the sensor signal Vs is changed in response to changes in the amount of received light. As a result, variations in the output timing of the BD signal can be reduced without using an expensive photodiode PD2 having a high response rate, thereby obtaining a stable BD signal at a low cost.

The two laser beams LB1 and LB2 are irradiated simultaneously, forming beam spots in a line that is slanted at the prescribed angle θ to the vertical line Lv perpendicular to the main scanning direction. Specifically, the two laser beams LB1 and LB2 are separated by the predetermined distance d in the main scanning direction. With this construction, the BD signal is first outputted when both the laser beams LB1 and LB2 are received simultaneously by the receiving surface 84a, and not when only the laser beam LB1 is received by the receiving surface 84a. Accordingly, variations in the output timing of the BD signals can be further suppressed to acquire a more stable BD signal.

Therefore, as the laser beams are scanned, the BD sensor 84 receives the laser beams one by one, and therefore the level of the signal Vg increases gradually. Accordingly, variations in the output timing of the synchronization signal can be suppressed to obtain a stable synchronization signal.

In the laser printer 1 of the preferred embodiment provided with the multi-beam scanner 16 described above, the laser beams LB1 and LB2 emitted from the multi-beam scanner 16 form an electrostatic latent Image on the surface of the photosensitive drum 27. Since the laser beams LB1 and LB2 are scanned over the surface of the photosensitive drum 27 in synchronization with the highly stable BD signal described above, it is possible to form a precise image on the paper 3.

While the invention has been described in detail with reference to the specific embodiment thereof, it would be apparent to those skilled in the art that various changes and modifications may be made therein without departing from the spirit of the invention.

For example, the laser diode unit LD in the preferred embodiment described above is provided with two light sources, i.e., the two semiconductor lasers LD1 and LD2. However, the present invention may also be applied to a laser diode unit having three or more light sources.

For example, a third light source can be added so that a third beam spot is formed on the slanted line Ls in FIG. 6 at a position separated the prescribed distance d from the beam spot BS1 in the main scanning direction. In this case, a BD signal may be outputted when all three laser beams are simultaneously irradiated on the receiving surface 84a or when the first two laser beams are irradiated on the receiving surface 84a.

Specifically, the receiving surface 84a may be configured to simultaneously receive all of or at least two of the plurality of laser beams, which are irradiated as being separated from one another at the prescribed interval "d". In either of these cases, the BD signal is outputted when all the laser beams that can be received by the receiving surface 84a simultaneously are received or when a desired number greater than or equal to two of the laser beams that can be received simultaneously by the receiving surface 84a is received.

The AD conversion circuit 86 in the preferred embodiment described above employs the switching operation of the transistor T1. However, the AD conversion circuit 86 may also be configured to output either a high level or low level signal based on a prescribed threshold level Vth using a comparator, for example. This configuration can suppress variations in the threshold level Vth itself. However, common comparators are not practical due to their slow response to changes in input signals. An expensive comparator is required to increase this response. Hence, it is desirable from an economic perspective to use the AD conversion circuit 86 having the transistor T1, as in the preferred embodiment.

Further, the load resistor RL in the preferred embodiment is a fixed resistor having a fixed resistance value (about r/2), but may instead be configured of a variable resistor that can be set to a desirable load resistance value. With this construction, an appropriate load resistance can be quickly set in response to changes in external parameters, such as when replacing the multi-beam scanner 16.

In the preferred embodiment described above, the present invention is applied to a laser printer. However, the present invention may be applied to a photocopier, a facsimile machine, or any image-forming device configured to form electrostatic latent images on a photosensitive drum using a plurality of semiconductor lasers.

What is claimed is:

1. A multi-beam scanner comprising:
   a semiconductor laser device having a plurality of laser light sources emitting a plurality of laser beams;
   a scanning device that scans the laser beams in a predetermined scanning direction at fixed time intervals within a predetermined scanning range;
   a light-detecting device that receives, at a location within the predetermined scanning range, the laser beams scanned by the scanning device and that outputs a light-reception signal, whose value corresponds to the total amount of light received, the number of laser beams, among the plurality of laser beams, that fall incident on the light-detecting device simultaneously changing as the scanning device scans the laser beams, the light-detecting device outputting the light-reception signal, whose value is greater than or equal to a predetermined synchronization detection level, when the light-detecting device receives the at least two of the laser beams simultaneously; and
   a synchronization signal outputting device that outputs a synchronization signal indicating a start timing at which the scanning device starts scanning the laser beams when the light-reception signal from the light-detecting device becomes greater than or equal to the predetermined synchronization detection level.

2. A multi-beam scanner as claimed in claim 1, wherein at least two of the plurality of laser beams are separated from each other by a predetermined distance in the scanning direction.

3. A multi-beam scanner as claimed in claim 1, wherein the light-detecting device includes:
   a photoelectric converting unit including a series circuit having a resistor and a photoelectric converting element, which are connected with each other in series, a constant voltage bias being applied to the series circuit, a potential at a contact point between the resistor and the photoelectric converting element decreasing in response to an increase in the amount of light received by the photoelectric converting element; and
   an inverse outputting unit that inverts the change in potential at the contact point to cause the potential to increase in response to an increase in the amount of the light received by the photoelectric converting element, the inverse outputting unit outputting the inverted potential as the light-reception signal,
   the resistor having a resistance value that allows, when the light-detecting device receives the at least two of the laser beams simultaneously, the inverse outputting unit to output the light-reception signal whose value is greater than or equal to the predetermined synchronization detection level, and that allows, when the light-detecting device receives one of the laser beams, the inverse outputting unit to output the light-reception signal whose value is smaller than the predetermined synchronization detection level.

4. A multi-beam scanner according to claim 3, wherein the resistor has the resistance value that is smaller than a value that allows, when the light-detecting device receives one of the laser beams, the inverse outputting unit to output the light-reception signal whose value is greater than or equal to the predetermined synchronization detection level.

5. A multi-beam scanner according to claim 2, wherein the light-detecting device outputs the light-reception signal, whose value is greater than or equal to the predetermined synchronization detection level, when the light-detecting device receives all the laser beams simultaneously.

6. A multi-beam scanner according to claim 2, wherein the scanning device scans the laser beams in the scanning direction while arranging the laser beams along a line that is slanted a predetermined angle relative to a straight line that is perpendicular to the scanning direction.

7. A multi-beam scanner according to claim 1, wherein each laser light source includes a semiconductor light-emitting element, further comprising:
- a plurality of modulating devices, each of which modulates, according to image data, a supply current supplied to a semiconductor light-emitting element in a corresponding laser light source;
- a photosensitive member having a surface, the scanning device scanning, on the surface, the laser beams emitted from the laser light sources to form an electrostatic latent image;
- a developing device that develops the electrostatic latent image formed on the surface of the photosensitive member; and
- a transferring device that transfers an image developed by the developing device onto a recording medium.

8. A multi-beam scanner comprising:
- a semiconductor laser device having a plurality of laser light sources emitting a plurality of laser beams;
- a scanning device that scans the laser beams in a predetermined scanning direction at fixed time intervals within a predetermined scanning range;
- a light-detecting device that receives, at a location within the predetermined scanning range, the laser beams scanned by the scanning device and that outputs a light-reception signal, whose value corresponds to the total amount of light received, the number of laser beams, among the plurality of laser beams, that fall incident on the light-detecting device simultaneously changing as the scanning device scans the laser beams, the light-detecting device outputting the light-reception signal, whose value is greater than or equal to a predetermined synchronization detection level, when the light-detecting device receives the at least two of the laser beams simultaneously, the light-detecting device including:
  - a photoelectric converting unit including a series circuit having a resistor and a photoelectric converting element, which are connected with each other in series, a constant voltage bias being applied to the series circuit, a potential at a contact point between the resistor and the photoelectric converting element decreasing in response to an increase in the amount of light received by the photoelectric converting element; and
  - an inverse outputting unit that inverts the change in potential at the contact point to cause the potential to increase in response to an increase in the amount of the light received by the photoelectric converting element, the inverse outputting unit outputting the inverted potential as the light-reception signal, the resistor having a resistance value that allows, when the light-detecting device receives the at least two of the laser beams simultaneously, the inverse outputting unit to output the light-reception signal whose value is greater than or equal to a predetermined synchronization detection level, and that is smaller than a value that allows, when the light-detecting device receives one of the laser beams, the inverse outputting unit to output the light-reception signal whose value is equal to the predetermined synchronization detection level; and
- a synchronization signal outputting device that outputs a synchronization signal indicating a start timing at which the scanning device starts scanning the laser beams when the light-reception signal from the light-detecting device becomes greater than or equal to the predetermined synchronization detection level.

9. An image-forming device comprising:
a multi-beam scanner, including:
- a semiconductor laser device having a plurality of laser light sources emitting a plurality of laser beams, each laser light source including a semiconductor light-emitting element;
- a scanning device that scans the laser beams in a predetermined scanning direction at fixed time intervals within a predetermined scanning range;
- a light-detecting device that receives, at a location within the predetermined scanning range, the laser beams scanned by the scanning device and that outputs a light-reception signal, whose value corresponds to the total amount of light received, the number of laser beams, among the plurality of laser beams, that fall incident on the light-detecting device simultaneously changing as the scanning device scans the laser beams, the light-detecting device outputting the light-reception signal, whose value is greater than or equal to a predetermined synchronization detection level, when the light-detecting device receives the at least two of the laser beams simultaneously; and
- a synchronization signal outputting device that outputs a synchronization signal indicating a start timing at which the scanning device starts scanning the laser beams when the light-reception signal from the light-detecting device becomes greater than or equal to a predetermined synchronization detection level;
- a plurality of modulating devices, each of which modulates, according to image data, a supply current supplied to a semiconductor light-emitting element in a corresponding laser light sources;
- a photosensitive member having a surface, the scanning device scanning, on the surface, the laser beams emitted from the laser light sources to form an electrostatic latent image,
- a developing device that develops the electrostatic latent image formed on the surface of the photosensitive member; and
- a transferring device that transfers an image developed by the developing device onto a recording medium.

* * * * *